March 23, 1954 — G. A. MINDER — 2,673,156
METHOD OF MAKING A COMPOSITE MEAT PRODUCT
Filed March 20, 1950 — 2 Sheets-Sheet 1

INVENTOR.
GEORGE A. MINDER
BY
Reynolds, Beach & Christensen
ATTORNEYS

INVENTOR.
GEORGE A. MINDER

Patented Mar. 23, 1954

2,673,156

UNITED STATES PATENT OFFICE 2,673,156

METHOD OF MAKING A COMPOSITE MEAT PRODUCT

George A. Minder, Seattle, Wash., assignor to Minder Bros., Inc., Spokane, Wash., a corporation of Washington Application March 20, 1950, Serial No. 150,629

3 Claims. (Cl. 99—107)

This invention relates to a composite food product, and more particularly to one composed wholly or principally of meat. More specifically, the product may be designated a layer steak by analogy to the well known layer cake. Just as a layer cake is composed of thin layers of cake held together by icing or a sweet filling, so the product of this invention is composed of thin slices of meat, perhaps with slices of certain other food products interspersed among them, such as of cheese, all of which slices are held together to form an integrate product.

Heretofore various expedients have been employed to tenderize meat which is inherently tough, and particularly the cheaper cuts of beef. This meat has been ground, or finely chopped, and then formed into patties to make Hamburg steak. A considerable amount of flour has been pounded into meat slices a half an inch or so in thickness to make Swiss steak. Meat has been cut relatively thin so that it can be cooked quickly, such pieces of meat being designated minute steaks. Smoked beef has been cut into thin slices known as chipped beef.

All these efforts to tenderize inherently tough meat in uncured condition have been only partially successful, and the term "chipped beef" has been applied only to smoked meat. A modification of this latter technique is disclosed in Dubil Patent No. 2,052,221 which discloses cutting lean, boneless, uncured meat into pieces, packing them into a desired form, and freezing them into a block. This block is then sliced into thin slices like chipped beef and the slices are either stacked and used as a single steak, known in the trade as "Chip steak," or they may be wrapped around or pierced by a skewer, or the slices may be pressed into a loaf at freezing temperature and the loaf, after being frozen, later cut into steaks for cooking. The difficulty with such chip steaks or loaves is that they are loosely stratified so that pronounced planes of cleavage exist between adjacent slices. While such a product is being cooked, therefore, the slices will slide across each other, because of the lack of unity of the product.

In accordance with the principal object of the present invention, the layer steak, while being completely tenderized, has its layers consolidated and intimately interknit to form a unified product which can be handled without the exercise of particular care, both in its frozen state and after thawing during cooking, without separation of any of the layers.

It is a further object to produce such a food product quickly and by a process capable of being carried out by machinery and more or less automatically.

Another object is to enable a product of this type to be made with such precision that the shape, size and weight of all layer steaks produced by it can be identical within a very small tolerance.

It is also an object to enable the composition of the product to be of any selected character within a wide range, thus enabling combinations of various kinds of meat and combinations of meat and cheese, for example, to be incorporated in a unified layer product.

More specifically, the product incorporates a stack of thin meat slices, all of approximately the same size and shape, among which meat slices may be interspersed similar slices of other food, such as cheese, and the slices are interknit by a multiplicity of incisions piercing the stack from opposite sides in staggered relationship. The edges of the slices formed by the incisions are curled inward by the piercing operation into overlapping relationship with an adjacent slice or slices, so that the edges curled oppositely in adjacent incisions knit together firmly all the slices into a unified layer product.

Briefly, the process utilized in making the multiperforate layer steak product includes the steps of removing bone and excess fat from meat, segregating the meat into pieces either by a cutting or very coarse grinding operation, and then packing the pieces of meat into molds of a desired shape, for example of circular cross section, and freezing it. After the meat has been properly aged in frozen condition, it is cut into thin slices at room temperature, yet while the meat is still unthawed, and a desired number of these slices is stacked. The number and thickness of slices preferably are selected so that the resultant steak will constitute an individual serving of average size. The stack of slices is then passed through an incising machine incorporating thin, sharp blades which pierce the stack of slices generally endwise in a multiplicity of locations, thus curling the edges of the slices formed by the incisions and thereby knitting together all the slices to form a unified layer steak product.

Additional features of the layer steak and of the process of making it will be pointed out in the following detailed description.

Figure 3 is a somewhat diagrammatic sectional view through the incising machine taken on a plane parallel to the direction of movement of the stack of slices through the machine and transversely of such stack.

Figure 4 is a top perspective view of a typical layer steak product, part of it being broken away and a section magnified to show details of its structure.

Fig. 5 is a magnified section of the portion broken away from Fig. 4.

Figure 1:
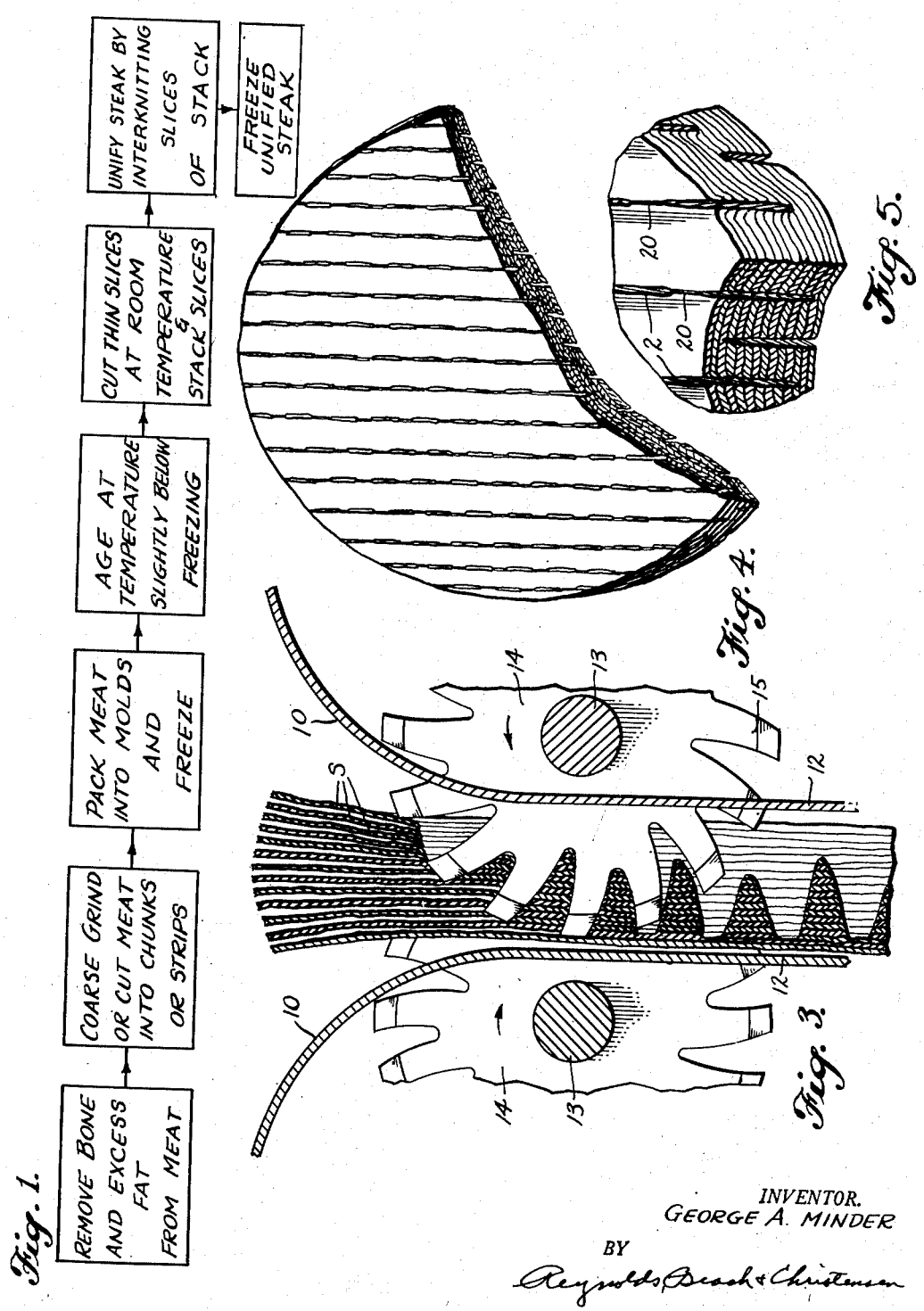
Figure 1 is a flow chart illustrating the various steps of the process followed in making a layer steak and the sequence of such steps.

In the manufacture of layer steaks in accordance with this invention various kinds and cuts of meat can be employed, but, because it is not important whether the meat utilized is tender, meat least suitable for other purposes, and thus cheapest, is entirely satisfactory. Thus, for example, if beef is used, the side of beef incorporating the ribs is quite acceptable for the process. From such meat the bone and excess fat are removed, leaving rather thin large sheets of principally lean meat. These sheets may be cut by hand into strips or chunks, or they may be passed through a very coarse grinding machine such as will reduce the meat to chunks shaped generally as cubes of perhaps an inch on each side.

The pieces of meat thus prepared are packed into molds of uniform size and shape. Such molds, for example, may be of circular cross section and, because of the yielding character of the meat, it can be packed into the molds more or less firmly, so that the same weight of meat will be placed in each mold.

The meat filling the mold is frozen, usually at a temperature well below zero Farenheit, to quick freeze the meat in conventional fashion. After the meat is thus frozen, it is placed in a holding compartment for several days, which is maintained at a temperature slightly below the freezing temperature of the meat, preferably at about 28 degrees Farenheit.

After the meat has thus been aged, it is sliced at room temperature while the meat is still unthawed and firm, although not frozen hard. At that time the temperature of the meat is probably in the range of 29 to 31 degrees Farenheit. It must be softened sufficiently so that it can be sliced readily with a sharp knife, preferably of the rotary type, yet not thawed so that it will be soft or flabby and yield excessively under the pressure of the knife. The thickness of the slices may be selected within the range of about one-sixteenth of an inch to one-fiftieth of an inch, but preferably each slice is about one-twenty-fifth of an inch in thickness.

Great flexiblity in thickness, area, shape and weight of the finished product is possible by varying the shape or size, or both, of the blocks into which the meat is frozen initially, the density of the meat as it is packed into the mold, the thickness of the slices cut from the block of meat, and the number of such slices stacked together to make the finished product. Also the composition of the final product can be varied by interleaving slices of different kinds of meat or other foods, such as cheese, in any desired proportion and arrangement.

Preferably the stack of slices prepared for unification in each instance is of a size to constitute an individual serving. By proper selection of the various factors mentioned above almost precise uniformity of shape, size and composition of the finished steaks can be secured. A typical example of the process and product may utilize molds which will form a frozen meat block of cylindrical shape approximately four and one-quarter inches in diameter, from which slices one-twenty-fifth of an inch thick are cut. Thirteen of these slices, when unified, will produce a final product approximately one-half inch in thickness, of slightly oval shape, having a major axis of approximately four and three-quarter inches in length and a minor axis approximately four and one-quarter inches in length, and having a weight of almost exactly three and two-thirds ounces.

Figure 2:
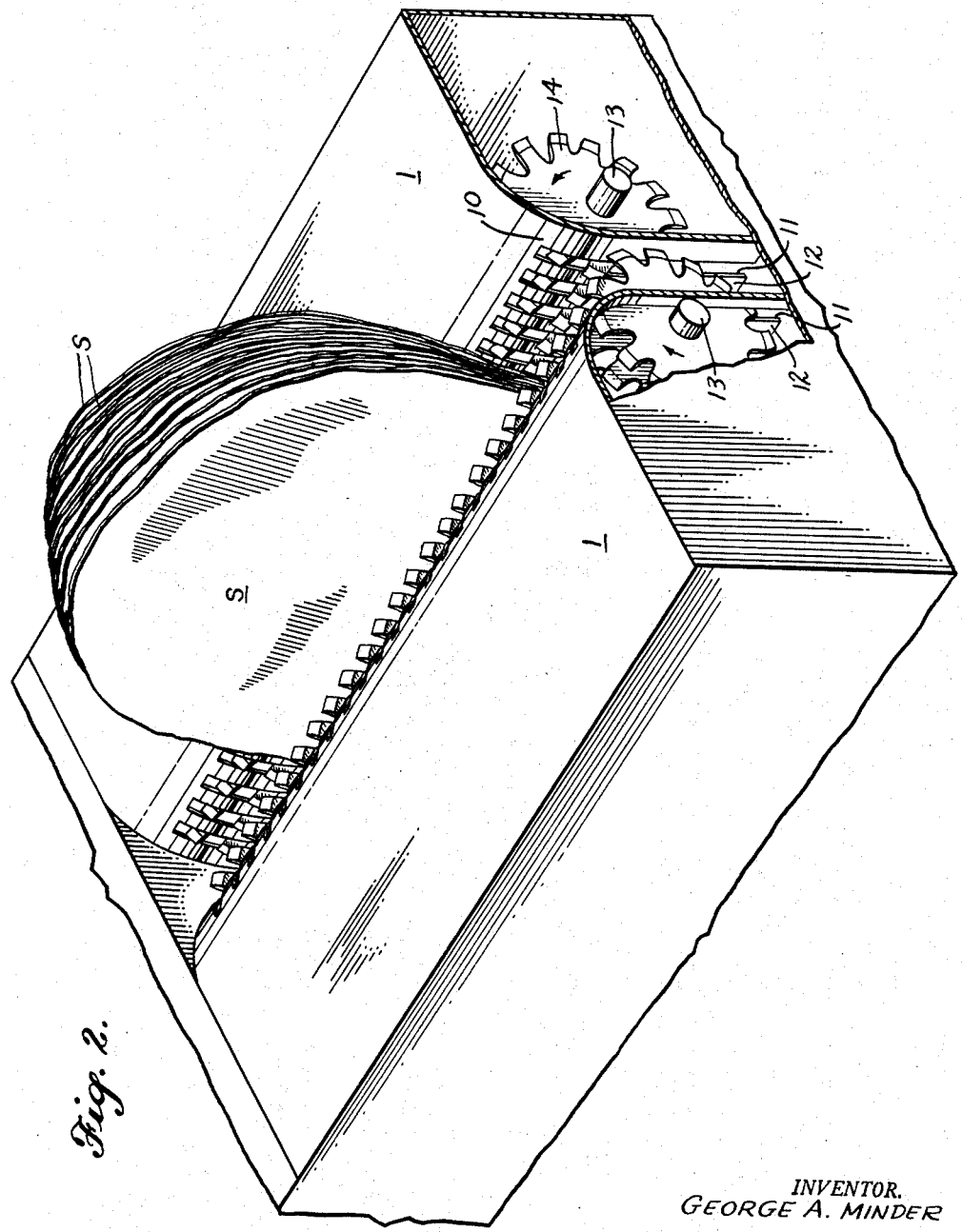
Figure 2 is a perspective view of a representative form of incising machine suitable for accomplishing the multiperforating, unifying step of the process.

When a stack of slices of desired thickness, number, and composition has been formed, depending upon the resultant product desired, the stack of individual slices is formed into a unified steak by interknitting the slices in the stack. This is accomplished by passing the stack of slices S through an incising machine, such as shown in Figures 2 and 3, for example. This machine has two plates 1 having gradually curved portions 10 which are adjacent to each other and converge toward each other to form an entrance throat into which the stack of slices is fed. These plates have a series of slots or deep notches 11 in their adjacent edges, such notches being closely spaced to define narrow strips or fingers 12 between them, like a comb. The notches in the adjacent portions of plates 1 are staggered so that the notches of one sheet lie directly opposite the fingers 12 of the other sheet.

Behind the plates 1 are mounted shafts 13 parallel to such plates and to each other. These shafts carry disks 14 spaced apart correspondingly to the spacing of slots 11 so that the periphery of each disk will project through a correponding slot to a location adjacent to the strip 12 of the other sheet opposite such slot. The periphery of each disk is notched to form thin blades 15 which preferably are sharpened at their ends, to penetrate endwise into the stack of slices. In a known commercial machine, alternate shallow and deep notches are formed in the peripheries of these disks, but such construction is not essential.

It will be evident that, with the arrangement shown, the generally radially projecting blades 15 defined by such notches will be disposed alternately along the path between the comb fingers 12, so that substantially equal numbers of blades project from opposite sides into such path in interdigitated fashion. If shafts 13 are now rotated by suitable power mechanism (not shown) in opposite directions and at the same speed, the disks 14 on the two shafts will likewise be turned oppositely as indicated by the arrows in Figure 3. The blades 15 will perform the dual function of piercing the slices of the stack at a multiplicity of locations arranged in parallel rows and curling the edges of the incisions thus made to interknit the slices of the stack, while at the same time compacting the stack of slices and propelling it through the path defined by the comb elements perpendicular to the shafts 13.

In order to make the piercing action of the blades 15 as nearly as possible of an endwise stabbing character, the blades are curved towards their tips in a direction counter to the direction of rotation of the disks, as shown in Figure 3. The final multiperforate layer steak product compacted and unified by passage through the incising machine as described, is shown in Figure 4. The magnified section of Figure 5 shows the incisions 2 arranged in parallel rows spaced apart a distance at least several times as great as the width of the incisions in the direction perpendicular to such rows, as shown in Figure 5 of the drawings. Such incisions are formed by the individual blades and connected by shallow grooves 20 formed by the central portions of the disks at the bases of blades 15.

The incising machine described is not part of the present invention, although it is of a type well suited to multiperforate the slices to unify the layer steak product by interknitting the slices in the stack. It will be evident, however, that other types of machines can be utilized to produce a multiplicity of incisions in the stacked slices, preferably from opposite sides of the stack and extending nearly through it, by which operation the edges of the slices formed by the incisions internally of the slices will be curled into overlapping relationship with adjacent slices to accomplish the interknitting action effective to unify the product. It will be evident that the same procedure may be employed whether all the slices are of the same kind of meat or the stack is made up of slices of different kinds of meat, or even including slices of other food, such as cheese. In any case, the slices will be firmly compacted and bound together.

Moreover, the consolidating action of the unifying step is made apparent by the increase in surface dimensions of the unified steak and the alteration of its shape from circular to generally elliptical shape. A stack of circular slices initially approximately four and one-quarter inches in diameter, after the unifying step will be of generally elliptical shape having a minor axis approximately four and one-quarter inches in length and a major axis of approximately four and three-quarter inches in length, where thirteen slices, each approximately one-twenty-fifth of an inch in thickness are incorporated in the stack thus processed. Also separation between the edges of the layers in the unified steak is rendered difficult because the slight irregularity of the edges of the individual slices, the inexact registry of the slices in the stack, the consolidating action effected by passage of the stack of slices through the incising machine, and the opposite bending of the cut edges of the slices in adjacent slits cut at intervals around the periphery of the stack by the piercing operation produces a puckered edge on the layer steak which makes the laminar or stratified nature of the steak structure almost indiscernible.

Following the unifying step, the layer steaks may be stacked suitably for storage in a refrigerator where their freezing may be renewed. They should be cooked promptly after being allowed to thaw out, and may be cooked even without being thawed first. It should be understood that the unifying operation should be accomplished before the slices have thawed completely, and preferably they will not have thawed appreciably more than when cut from the block of unthawed meat in the slicing operation. In fact, it is desirable to make the layer steaks in a continuous process so that multiperforation of the stack of slices follows immediately after the slices are cut from the block of meat and arranged in a stack.

I claim as my invention:

1. In the method of forming a layer steak, the step comprising cutting incisions through a plurality of slices in a stack of superposed meat slices, each slice being of a thickness between $1/50$ and $1/16$ of an inch, and thereby piercingly slitting simultaneously at a multiplicity of locations slices on each side of said stack, and said incisions consolidating the stack and interknitting the slices therein.

2. In the method of forming a layer steak, the step comprising cutting incisions through a plurality of slices in a stack of superposed unthawed meat slices, each slice being of a thickness between $1/50$ and $1/16$ of an inch, and thereby piercingly slitting simultaneously at a multiplicity of locations slices on each side of said stack, and said incisions consolidating the stack and interknitting the slices therein.

3. In the method of forming a layer steak, the step comprising simultaneously cutting incisions through a plurality of slices in a stack of superposed unthawed meat slices, each slice being of a thickness between $1/50$ and $1/16$ of an inch, and thereby piercingly slitting the slices in said stack at a multiplicity of locations spaced along parallel rows at opposite sides of the stack, the piercing in adjacent rows being effected from opposite sides of the stack, and said incisions consolidating the stack and interknitting the slices therein.

GEORGE A. MINDER.

References Cited in the file of this patent

UNITED STATES PATENTS

| Number | Name | Date |
|---|---|---|
| 1,956,239 | Kuhner | Apr. 24, 1934 |
| 2,052,221 | Dubil | Aug. 25, 1936 |
| 2,137,897 | McKee et al. | Nov. 22, 1938 |
| 2,251,801 | Plitt et al. | Aug. 5, 1941 |
| 2,398,636 | Henny et al. | Apr. 16, 1946 |
| 2,516,621 | Deckert | July 25, 1950 |